Sept. 18, 1945.　　　　J. R. NIEMAN　　　　2,385,100
SPEED COMPUTATOR
Filed April 10, 1944　　　　2 Sheets-Sheet 1
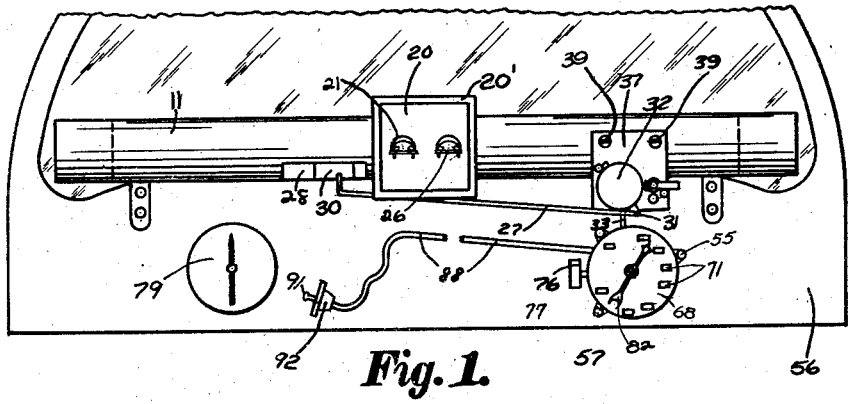
Fig. 1.
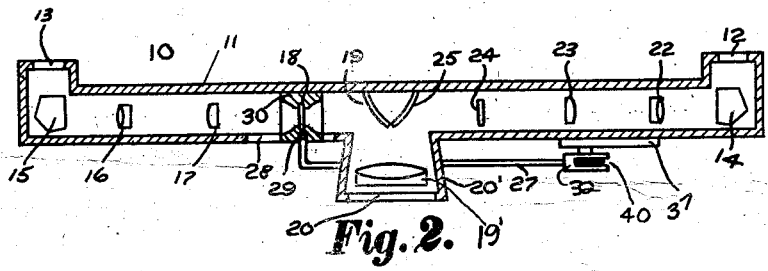
Fig. 2.
Fig. 3.　　　　Fig. 4.
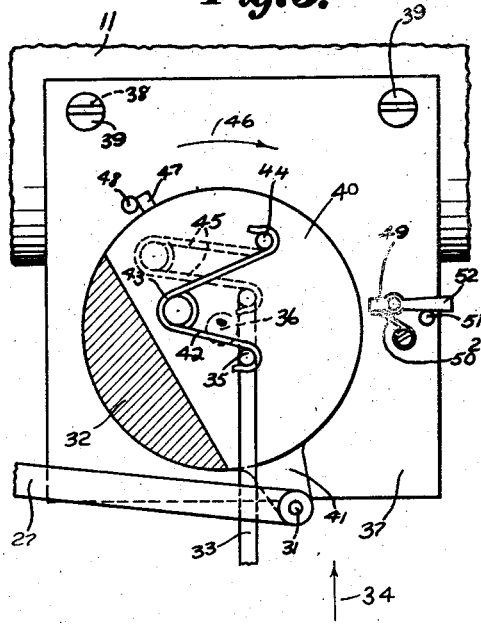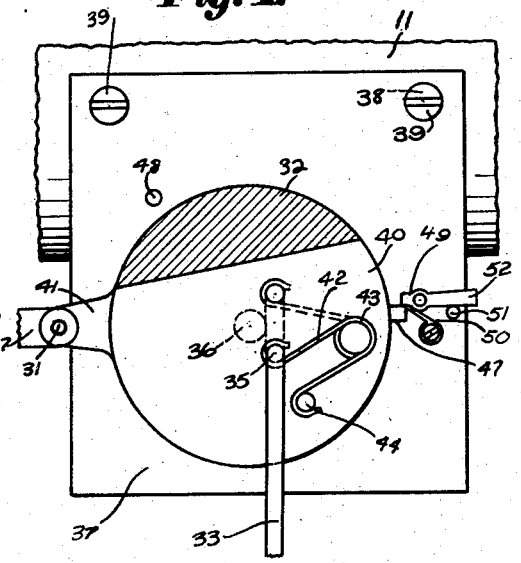
Inventor
John R. Nieman
Arthur H. Sturges
By
Attorney

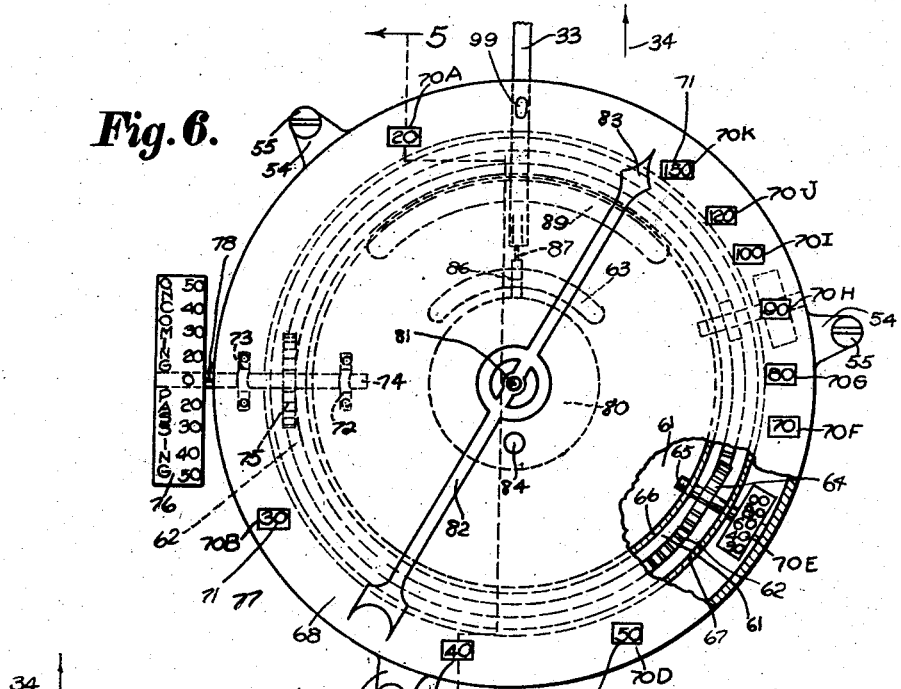
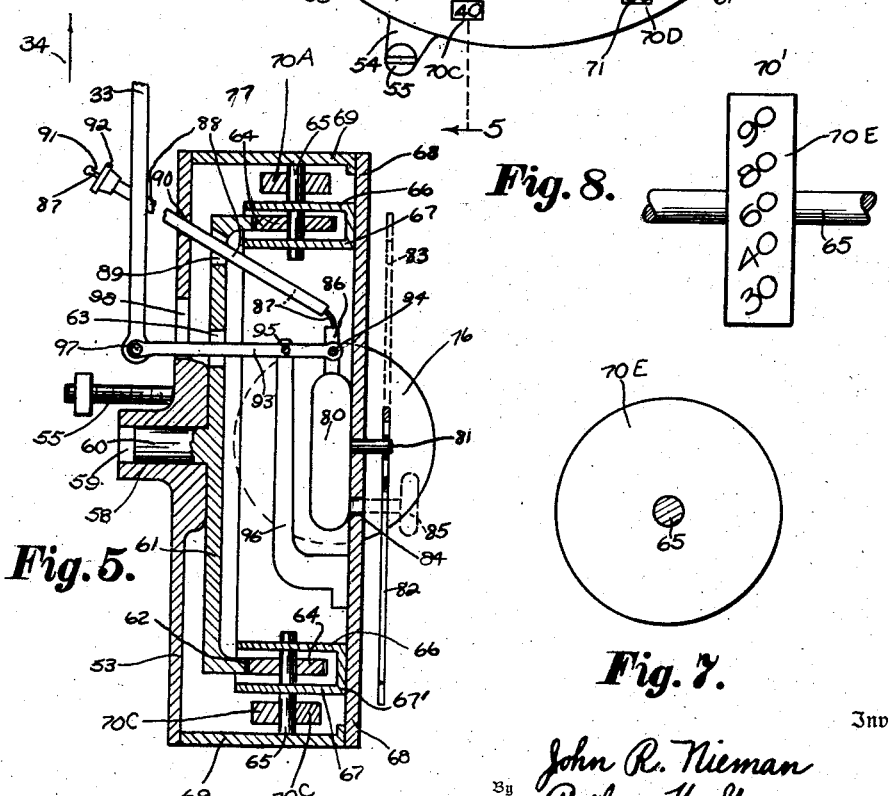

Patented Sept. 18, 1945

2,385,100

UNITED STATES PATENT OFFICE 2,385,100

SPEED COMPUTATOR

John R. Nieman, Peoria, Ill., assignor to Dolores Ellen Nieman, Peoria, Ill.

Application April 10, 1944, Serial No. 530,319

8 Claims. (Cl. 88—2.7)

This invention relates to calculating devices and has for an object to provide a mechanism such that an operator, while seated upon either a moving or stationary vehicle, or while said device is in a stationary position and detached from his vehicle, may accurately ascertain the speed of a second vehicle for traffic law enforcement purposes, and may similarly ascertain the speed of other moving objects for many useful purposes.

A further object of the invention is to provide a speed computator for the above stated purposes, arranged to compensate for the speed of travel of an automobile provided with the device of the present invention, and with respect to a second and moving automobile at times when the latter is under observation by said operator. Said device to be operative without regard to the direction of travel of said second vehicle with respect to the first mentioned automobile.

Another object of the invention is to provide a device for the above stated purposes which is adapted to check the speed of airplanes and other moving objects with equal facility, as an ascertaining of the speed of motor driven vehicles.

A still further object of the present invention is to eliminate the necessity, as heretofore, of traffic patrolmen using their unaided judgment in arriving at a decision concerning the speed at which a motorist is traveling.

An important object of the present invention is to eliminate the necessity of a traffic patrolman trailing a motorist for ascertaining the speed of the latter.

Other and further objects and advantages of the invention will be obvious from the following detailed description thereof.

In the drawings, Figure 1 is a view of a range finder employed and showing the latter mounted in a position of use behind a fragment of the transparent wind-shield of a motor vehicle or automobile.

Figure 2 is a longitudinal section of the range finder shown in Figure 1, certain lenses employed being illustrated diagrammatically, the range finder being turned 90 degrees with respect to the showing thereof in Figure 1.

Figure 3 is a face view of an attaching plate, having mounted thereon certain actuating mechanism employed for adjusting one of the lenses of the range finder, and showing the relative position of parts at times when the finder is adjusted or set for a distance of 500 yards.

Figure 4 is a view similar to Figure 3, and showing said actuating mechanism adjusted or set for a distance of 250 yards.

Figure 5 is a vertical section of a speed dial and adjunct parts employed, the view being taken approximately on line 5—5 of Figure 6.

Figure 6 is a face view of the speed dial shown in Figure 5, certain portions thereof being broken away and others represented by dotted lines.

Figure 7 is a side elevation of one of a plurality of speed compensating discs employed.

Figure 8 is an edge view of the disc shown in Figure 7.

As heretofore practiced in the art, it is well known that arguments and mistakes are occasionally made during a trial of traffic law violators accused of speeding, whereby courts make erroneous adjudications since a traffic officer's speedometer may be at a variance with the speedometer of the vehicle of an offender. Also, as heretofore practiced, no means have been provided for observing a speed violator from a distance, and the present invention aims to provide means for obviating the undesirable features of the prior practice.

Primarily the combination of the present invention includes a range finder or optical device provided with a suitable translucent screen for displaying images of moving objects thereon; a speed dial having spaced-apart sets of numerals disposed adjacent the periphery thereof; a suitable watch mechanism for causing an indicator to move over said sets and stop adjacent one set for indicating speeds of moving objects; means for initiating an actuation of said stop watch mechanism and indicator; said actuating means being so arranged that it performs three purposes; namely, for causing a stoppage of said indicator, a starting thereof and a return of the indicator to its starting position after said stoppage, and means for causing a lense of said range finder or optical device to shift at certain times, responsive to an actuation of said stop watch mechanism, and at times when the shifting means is unlatched.

Also the device of the present invention preferably includes a means for compensating for the speed of movement of a traffic officer's vehicle at times when the device of the present invention is attached thereto as shown in Figure 1, for certain uses of the invention.

In the drawings, 10 indicates generally a range finder such as or similar to that certain range finder shown and described in the booklet published by the War Department of the United States of America, the title of which is "Technical Manual, TM 9-1585, May 23, 1941," concerning ordnance maintenance and range finders and the like, said publication being for sale by the Superintendent of Documents, Washington, D. C., price 15 cents per copy.

The particular range-finder device employed with other instrumentalities in the combination of the present invention is, however, slightly modified with respect to the range finder of said publication, said modification being primarily as herein stated.

The range finder or optical device employed in the combination of the present invention differs from the range finder described in the said publication in the following respects:

One end or a half portion of the range finder of the publication is the same as the range finder of the present invention and the other half portion or end thereof is the same except that a correction lens similar to the correction lens in the other end of the finder, has been inserted between the observation lens thereof and the measuring wedge-shaped lens so that all light-ray images gathered by the range finder from both ends of the latter will be projected onto a screen employed in a right-side-up position. Another difference between the two range finders is that the center occular prisms of the range finder of said publication have been omitted and two concavo-convex mirrors have been substituted therefor, for the purpose of magnifying images as well as for projecting them upon a screen employed.

A still further difference is that the eye piece of the range finder of the publication has been omitted since it is too small for the particular use in the instant combination with the other instrumentalities of the present invention and in lieu of said eye piece, a frosted glass screen of comparatively large area is substituted for said eye piece whereby an operator of a motor vehicle, while seated at the steering wheel thereof, may visualize images upon the said screen without interfering with his operation of the vehicle.

Since the minutiae of a conventional range finder such as is described in the said publication is well known, it is believed not to need a detailed description or illustration herein.

The range finder 10 includes an elongated tubular housing 11, having an opening 12 at one end thereof, and a similar opening 13 at its other end. As best shown in Figure 2, the openings 12 and 13 are disposed in parallelism with respect to the longitudinal length of the housing 11, and may be covered with clear optical glass for preventing debris from entering the housing.

Two pentaprisms, 14 and 15, are provided adjacent the openings 12 and 13 respectively. The pentaprisms in operative effect are mirrors so disposed that light-ray images which enter through said openings are projected at a right angle and longitudinally of the housing 11, toward the center of the latter. An image of an object, moving or stationary, reflected from the mirror 15, is projected to and through an object lens 16 axially of the latter, whereby the image becomes reduced in area. Said image-ray, upon passing through the lens 16, is projected onto and through a correction lens 17. The lens 17 causes the image to appear right-side up at the time said image is displayed for view upon a later described screen. From the lens 17, said light-ray image is projected through a wedge-shaped shiftable lens 18.

The light-ray image, upon passing through the slideable lens 18, is projected upon a concavo-convex mirror 19, the latter being disposed inclinedly with respect to the alignment of the lenses 16, 17, and 18. The inlined mirror 19 causes the image to be projected upon a frosted glass or similar translucent screen 20, at a right angle with respect to the longitudinal axis of the housing 11, and since the mirror 19 is of convexed contour, said image becomes magnified on the screen. The image of said object, reflected from the mirror 19, is indicated at 21 in Figure 1, said image being depicted in the form of an automobile as outlined in said figure. A collecting or condensing lens 19' is preferably employed as shown.

The screen 20 is disposed at and supported by the wider end of a flared hood 20', and in parallelism with the longitudinal axis of the housing 11. The narrower open end of the hood is suitably secured to or is integral with said housing.

Light-ray images gathered by and projected from the pentaprism or mirror 14 are similarly reflected and projected to the screen 20, through an arrangement of lenses indicated at 22, 23, and 24. A second concavo-convex magnifying mirror 25 is employed, as shown in Figure 2, for projecting images from the mirror 14, as received through the opening 12, upon the suitable screen 20.

The image indicated at 26, in Figure 1, is reflected from and magnified by the mirror 25, whereby at times the images 21 and 26 are replicas of each other or dual images disposed side by side at times on the screen. At other times, said images are blended together into a coincidence by means and for purposes later described.

The lenses above mentioned are all stationary in use, with respect to the housing 11, with the exception of the shiftable lens 18. The lens 18 is movable longitudinally of the housing 11, by means of a rod 27. An up-turned end of the rod 27 extends through a slot 28, formed through the wall of the tubular housing 11. That end of the rod 27, which is disposed within the housing, is provided with a ball 29. The ball is engaged in a socket of complemental shape formed in the lens holder 30, for the lens 18, whereby at times when the rod 27 is moved longitudinally in either direction, a corresponding movement is imparted to the lens holder 30, since the holder 30 is slideably disposed with respect to the inner surface of the housing for supporting the wedge-shaped lens 18, as best shown in Figure 2.

In Figure 2, the lens 18 is in a normal position, and when in said normal position, at times when images of an object are projected to the screen 20, and said object is not at the exact distance away from the range finder for which the latter is set, said images appearing on the screen will be juxtaposed as shown in Figure 1, at 21 and 26. At times when the images as shown in Figure 1 have blended together into a single image and have merged into coincidence, the lens 18 may be shifted by an operator so as to cause dual images to reappear so that an object or vehicle under observation, upon continuing its travel, may again cause the images on screen 20 to blend together a second time by arriving at the range or distance which has been set on the range finder by the new position of the lens 18. By this means, the operator of the device is given notice when to manually initiate an actuation of a later described speed-finding mechanism for ascertaining the speed of a vehicle under observation.

This said mechanism includes a stop watch, the arrangement being such that the operator presses a later described button for actuating the stop-watch at the time the images 21 and 26 blend together into coincidence, and again presses said button for stopping the mechanism of the stop-watch at the time said images become blended together the second time. By this arrangement, there is expiration of an interval of time between the first and second blending together or coincidence of the images.

Also, the mechanism is such that said interval of time is accurately measured, whereby the speed of the vehicle under observation may be readily computed. Also, by means of sets of numerals preferably employed and later described, with other parts of the present invention, said measurement of said time is conveniently translated into a miles-per-hour speed at times when said sets of numerals are employed.

In order to move the rod 27 and the lens 18 toward the prism 15, for causing dual images to appear on the screen 20, that end of the rod 27, which is disposed toward the prism 14, is pivotally attached as at 31, to a rotatable spring-housing member or knob 32. At times when the housing 32 is caused to rotate about 120 degrees, the pivot 31 and the rod 27 are thereby moved from the position thereof shown in Figure 3, to the position thereof shown in Figure 4, for causing a corresponding movement of the lens 18, for the above described purpose of causing dual images on the screen 20.

The member 32 is rotatable about 120 degrees at times when a push-rod 33 is moved in the direction of the arrow 34. Also, the member 32 may be directly and manually rotated for purposes later described. One end of the push-rod 33 is pivotally attached, as at 35, to a later described spring and the push-rod 33 is disposed to one side of "dead center" of the pivot pin 36 of the housing 32, as shown in Figures 3 and 4.

The housing or knob 32 is pivotally mounted as at 36, to an attaching plate 37, the latter being provided with apertures 38 for receiving screws 39 therethrough, whereby the plate 37 may be readily attached to the outer side of the range-finder housing 11, as shown in Figure 1.

The housing 32 is incised preferably, whereby a later described spring is disposed within the slot 40 provided by the incision, so that the spring is protected against breakage and contact with extraneous objects. The upper end of the push-rod 33 extends into the slot 40, of the housing 32. The housing 32 is provided with an outstanding arm 41, to which the pivot-pin 31 is attached for securing the above-described rod 27 thereto.

Adjacent the upper end of the push-rod 33, the latter is secured to a spring 42. One end of the spring 42 is bent around the pin 35, and the latter attaches the push-rod 33 to the knob 32. The spring 42 is in the form of a wire having a coil 43. The other end of the spring 42 is bent around and secured to a second pin 44, the latter being secured to the member 32. The ends of the spring 42 are thus rotatable, slidingly on their respective pins.

At times when the rod 33 is moved in the direction of the arrow 34, the two ends of the spring 42 are moved toward each other until they assume the approximate position thereof, shown by the dotted lines 45, in Figure 3. About the time the spring assumes the form shown by the dotted-line contour and position thereof indicated at 45, the urge of the coil 43 of the spring exerted on the pin 44 causes the latter and the housing 32 to revolve in the direction of the arrow 46, with a suddenly applied motion, causing the member 32 to rotate approximately 120 degrees, thereby causing the parts to assume the position thereof, as shown in Figure 4.

Upon the perimeter of the housing or knob 32, a lug 47 is provided which is adapted to strike a stop 48, for preventing too great a rotation of the housing in a direction reverse to arrow 46. The stop 48 is rigidly affixed to the stationary plate 37.

At times when the housing 32 is rotated in the direction of the arrow 46, the lug 47 strikes the upper side of a tiltable detent-lever 49, causing one end of said lever to move downwardly against the urge of a spring 50, until such time as the lug 47 is below the detent 49. As soon as the lug 47 is below the detent, the spring 50 causes the detent to assume a horizontal position, and a second stop 51 is provided upon the face of the attaching plate 37, for preventing the spring 50 from urging the end of the lever which contacts the lug 47, to be above a horizontal position.

By this means, at times when the lug 47 is against the lower side of the adjacent end of the lever 49, a movement of the housing 32, in a direction reverse to the direction of the arrow 46, is prevented. Also, at times when the operator desires to release the detent lever 49, for purposes later described, the operator places his finger under the end 52 of the lever 49, for overcoming the urge of the spring 50, for tilting the lever 49 toward a vertical position, whereby the lug 47 can return to its normal position against the stop 48.

At times when the lug 47 is below the lever 49, said lug and lever are then in the position shown in Figure 4, and the rod 27 has moved the lens 18 away from the mirror 19, for causing the lens 18 to be returned to its normal position.

At times when the lug 47 is against the lever 49, as shown in Figure 4, the spring 42 is then in the full line position thereof, as shown in Figure 4, and in order to cause the member 32 to rotate in a direction reverse to the arrow 46, for returning the lens 18 to its normal position, the operator first releases the detent-lever 49 with his finger as above described, whereupon the coil 43 causes the spring 42 to expand, thereby causing the member 32 to be rotated to a normal position as shown in Figure 3.

The action of the spring 42 for rotating the member 32 is very similar to the action of the spring of the conventional mechanism employed for opening and closing the shutter disposed across the lens of a camera.

Referring to Figure 6, the present invention preferably further includes a casing or back plate 53, provided with a plurality of outstanding apertured tangs 54. Bolts or other suitable keepers 55 are disposed through the apertures of the tangs 54, for securing the casing 53 in a stationary-vertical position to the dash-board 56 of an automobile, the latter being generally indicated at 57. The casing 53 is provided with a boss 58, having an aperture 59, in which a shaft 60 is journaled. The inner end of the shaft is rigidly secured to a large pinion 61, the latter having an annular row of teeth 62. The face of the pinion 61 is provided with an aperture 63 which, as shown by dotted lines in Figure 6, is of segmental arcuate contour in plan for receiving therethrough a later described lever for permitting the pinion to shift about 90 degrees without contacting said lever.

The teeth 62 of the pinion are in constant mesh with the teeth of a plurality of spur wheels 64, eleven of the latter being preferably employed.

As best shown in Figure 5, each spur wheel is provided with an axle-shaft 65, rigidly secured thereto. Each shaft 65 extends through the oppositely disposed, spaced-apart side-walls 66 and 67 of an annular channel-ring 67', and the latter is secured to the inner surface of a speed-dial plate 68, for supporting the spur wheels 64, between the walls of the channel. The plate 68 is secured by any suitable means to the annular wall 69, of the casing or back plate 53, being stationary therewith. Each shaft 65 has rigidly mounted thereon a disc. The eleven discs, 70A through K, are between the annular wall 69 of the casing and the adjacent side wall 66 of the annular channel ring.

At times when the large pinion 61 is rotated, a corresponding movement is imparted to the spur wheels 64, for rotating the discs, 70A through K, correspondingly and simultaneously. The discs are all alike with respect to each other with the exception that numerals, indicated generally at 70', disposed on the perimeter of the discs are not the same.

Thus, the disc 70A shown in Figure 6, has the numerals or characters 0, 20, 40, 50, 60, and 70, disposed in spaced-apart sequence on its perimetrical edge, and three of the successive spaces of the disc 70A are blank; similarly, the disc 70B is provided with the numerals 0, 10, 30, 50, 60, 70, and 80, and two spaces are blank; the disc 70C is provided with the numerals 0, 10, 20, 40, 60, 70, 80, 90, and one blank space; the disc 70D is provided with the numerals 0, 10, 20, 30, 50, 70, 80, 90, and 100, and none of the spaces thereof are blank; the disc 70E is provided with the numerals 10, 20, 30, 40, 60, 80, 90, 100, and 110, some of which are depicted in Figure 8; the disc 70F is provided with the numerals 20, 30, 40, 50, 70, 90, 100, 110, and 120; the disc 70G is provided with the numerals 30, 40, 50, 60, 80, 100, 110, 120, and 130; the disc 70H is provided with the numerals 40, 50, 60, 70, 90, 110, 120, 130, and 140; the disc 70I is provided with the numerals 50, 60, 70, 80, 100, 120, 130, 140, and 150; the disc 70J is provided with the numerals 70, 80, 90, 100, 120, 140, 150, 160, and 170; and the disc 70K is provided with the numerals 100, 110, 120, 130, 150, 170, 180, 190, and 200. The above described sets of numerals and their discs are adequate for use in ascertaining the speed of road vehicles and the like, and it will be understood that for airplane use, further discs which contain numerals of higher value, may be employed.

The face of the speed dial 68 is provided with eleven apertures 71 of rectangular shape in plan, through which only the numerals of the discs 70A through K, which are exposed to view through said openings, are visible, the other numerals of said discs being masked by the dial plate 68, until such time as the discs are rotated for displaying said other numerals through said openings.

The plate 68 is in operative effect a large face for the smaller face or dial face of a later described stop watch, said large face or plate 68 being necessary for supporting the revoluble discs 70A through K, and their driver spur wheels 64.

The openings 71 and the discs 70 are progressively spaced apart farther and farther, with respect to each other, and with respect to the zero character 99 provided on the face plate 68, as shown in Figure 1, said character 99 being the normal position and starting point of a later described revoluble indicator 83, which cooperates with the openings 71 and the numerals of the discs 70A through K, for designating the speed of travel of an object for a distance of 250 yards. The indicator 83 and its supporting hand 82 are rotated over the openings 71 in a clockwise direction by a stop watch 80, and the spacing of the openings 71 are complemental to the speed of movement of the indicator hand 82 for measuring the speed of movement of an object traveling at 150 miles per hour, or 20 miles per hour, and all intermediate speeds.

Referring to Figure 6, pillow-blocks 72 and 73 are illustrated by means of dotted lines. The blocks are secured to the inner surface of the speed-dial plate 68 for providing a journaled support for a shaft 74.

Between the pillow blocks, a pinion 75 of suitable diameter is rigidly secured to the shaft 74 and the pinion 75 is in constant mesh with the teeth 62 of the large pinion 61, whereby, at times, when a rotary movement is imparted to the shaft 74 and the smaller pinion 75, the latter drives the large pinion 61 correspondingly for imparting a revolvable movement to the spur wheels 64 for rotating the above described eleven discs 70A to K inclusive, in a selected direction.

The outer end of the shaft 74 is splined or otherwise suitably secured to a manually rotatable speed compensating node 76, the latter being provided on its perimetrical annular surface with certain spaced-apart numerals, which are: 20, 30, 40, and 50, disposed at one side of a zero character thereon, and a similar set of numerals at the other side of said character as shown in Figure 6.

The speed-dial and its adjunct parts are generally indicated at 77. The upper portion of the vertically disposed node 76 is used in conjunction with on-coming automobiles or objects during an approach thereof, toward an observer seated within the automobile 57. That portion of the node 76 which is below said zero character constitutes the lower portion of said node, and said lower portion is used in conjunction with automobiles which are traveling away from said observer.

An indicator mark or line 78 is provided on the face of the speed-dial plate 68, adjacent a side edge of the speed-compensating node 76, as shown in Figure 6, for convenience in aligning any certain one of the numerals of the node 76 properly for uses as later described.

At times when the node 76 is manually rotated by the operator, a corresponding movement is applied to the pinion 75, for causing the large pinion 61 to rotate slightly for shifting the discs 70A through K, correspondingly. At times when the vehicle 57 is traveling at a speed of 20 miles per hour, as ascertained by observing the conventional speedometer 79 of the vehicle 57, and the operator desires to know the speed of travel of a vehicle or object which is coming toward him, said operator rotates the node 76 so that the numeral 20 of the upper portion of the node 76 becomes aligned with the indicator or mark 78, whereby the numerals on the discs 70 become shifted from their normal position as shown in Figure 6, so that said numerals appearing through the openings or apertures 71 of the dial face 68, become correspondingly reduced in value by 20. Similarly for noting the speed of a vehicle or object which is going away from the operator and at times when his vehicle 57 is traveling at 20 miles per hour, the operator shifts the node 76 so that the numeral 20 of the lower portion of the node 76 becomes aligned with the indicator or mark 78, for increasing the value of the numerals of the discs 70 correspondingly, so that the speed of the vehicle 57 is compensated for during an ascertaining of the speed of a traffic law violator's vehicle, and the speed of said violator is correctly gauged by the employment of said range-finder and other parts of the invention.

Referring to Figure 5, between the speed-dial face plate 68, and the casing 53, a stop-watch 80 is secured to the inner surface of the speed-dial plate 68 by any suitable means not shown.

From the housing or casing of the stop-watch 80, a shaft 81 extends, said shaft being rotatable by said mechanism of the watch in a clockwise direction. The outer end of the shaft 81 extends outwardly of the face of the speed-dial plate 68, and a hand 82 is rigidly secured to the shaft 81, said hand having an indicator end 83 of acute shape in plan, being revolvable by the mechanism of the stop-watch at times when actuation of the watch is initiated by an operator. An aperture 84 is provided through the speed-dial plate 68, through which a key 85 may be inserted for winding the main-spring of the stop-watch mechanism in a well-known manner, at times when the hand 82 is in a stationary and normal position.

The stop-watch mechanism 80 has the usual triple-acting detent therein for preventing the main-spring of the stop-watch from revolving the shaft 81, and for permitting the same. At times when said detent is released, said spring causes the indicator 82 to revolve over the annular row of spaced-apart sets of numerals adjacent the perimeter of the speed-dial plate 68. The stop-watch mechanism also includes a plunger 86 for releasing said detent by a movement of said plunger; and the latter, and said detent are so arranged that a second and later stroke of said plunger thereby stops the watch mechanism and its shaft 81. Since said mechanism and the detent within the stop-watch are conventional, they are believed not to need a particular illustration herein.

A length of piano wire 87 is employed, having an end joined to the plunger 86 of the watch mechanism for actuating the detent within the watch. The piano wire 87 is slidably disposed through a flexible conduit 88 which extends through an elongated arcuate-aperture 89, provided through the large shiftable pinion 61 for permitting the pinion to shift. Also, the conduit 88 extends through an aperture 90 provided through the back-plate 53 of the speed-dial casing, being soldered or otherwise suitably secured to the wall of the aperture 90.

The outer free-end of the semi-flexible piano wire is provided with a push-button 91, said wire extending through a finger-hold flange 92, the construction being similar to the shutter actuating wire and mechanism of a conventional camera. At times when the button 91 is pressed toward the stop-watch 80, the wire slides within the conduit 88 and causes the detent within the stop-watch to be actuated.

One end of a swingable lever 93 is pivotally secured to the plunger 86, as at 94. Between the ends of the lever 93, the latter is pivotally mounted, as at 95, to an arm-support 96. The arm 96 is rigidly secured to the inner surface of the speed-dial plate 68.

An outer end of the lever 93 is pivotally connected, as at 97, to the heretofore described push-pull or reach-rod 33, whereby an inward movement of the piano wire 87 for depressing the plunger 86 for actuating the detent within the stop-watch mechanism 80, simultaneously causing an upward movement of the reach-rod 33 for rotating the knob or spring housing 32, as above described, for causing a corresponding movement to be applied to the lens 18. The lever 93 extends through the above mentioned segmental arcuate aperture 63, and also through an aperture 98, provided through the casing 53.

In the use of the device, a traffic officer's vehicle is parked or moving upon a street or highway which is fairly straight, said street permitting an observation, over a distance of more than approximately 500 yards, of a vehicle, the speed of movement of which the officer desires to ascertain.

There are five primary uses of the above described parts as set forth in the following examples respectively numbered 1, 2, 3, 4, and 5. In Examples 1, 2, and 3, the officer's or operator's vehicle is stationary and the means for compensating for the speed of movement of said vehicle is not utilized. In Examples 3 and 4, the use of said compensating means is stated.

*Example 1*

The patrolman's vehicle is parked stationary, and all parts of the device are in a normal position, and a vehicle is approaching the stationary device of the present invention, for ascertaining the speed of said approaching vehicle, the operation is as follows: At the time the oncoming speeder is 500 yards from the officer, images of the speeding vehicle will be in coincidence on the screen 20, since the shiftable lens 18 is in a normal position, complemental to said 500 yards' distance. At this time, the bifurcated knob 32 is in the relative position with respect to the other parts of the device as shown in Figure 3, whereby the arm 41 of the knob 32 is in a downward position.

At the time the initial dual images 21 and 26 of the speeder appearing on said screen merge or blend into coincidence, and one image of said speeder appears on said screen, said time being at the time the speeder is 500 yards' distance from the said optical device 10 and operator, as above described, the operator at said instant of coincidence presses the button 91 toward the stop-watch which causes an actuation of the latter, releasing the detent within said watch which causes the indicator 83 and its hand 82 to revolve in a clockwise direction from its initial stationary position above the character zero, indicated at 99; said movement of the button 91 simultaneously causing the lens 18 of the range-finder to be shifted through the above described means and mechanism, including the knob 32 for changing or shifting the range setting of the optical device 10 from its normal setting of 500 yards to 250 yards, said change simultaneously, then causing the image of the approaching speeding automobile to appear on said screen as a dual image as depicted and indicated at 21 and 26 in Figure 1, whereby at the time said speeding automobile reaches a distance of 250 yards from the officer and said optical device, the images 22 and 26 of said approaching speeder will again then be merged into coincidence and a single image be displayed on said screen at the distance of 250 yards.

At the instant of the second occurrence of coincidence at said 250 yards distance, the operator then depresses the button 91 a second time toward the stop-watch for causing stoppage of the stop-watch mechanism and the indicator 83 rotated thereby. The indicator 83 will then be adjacent one of the openings 71 or exactly over one, as the case may be. When exactly over an opening 71 and over one set of numerals visible through said opening 71, the set of numerals thus pointed out, designates the speed of travel of the vehicle under observation while said vehicle traversed a distance of 250 yards since the spacing of said sets of numerals is complemental to the time-lag between the starting and stopping of the indicator 83. As shown in Figure 6, the speeder would be traveling more than 150 miles per hour.

The officer, upon observing that the vehicle did exceed the speed limit provided by law, then governs himself accordingly. The operator then or later, again presses the button 91 for returning the indicator 83 to its normal position above the zero character 99 of the speed-dial, and said operator also releases the detent lever 49 with his finger for permitting the spring 43 to return the lens 18 to its normal position as shown in Figure 2, whereby the images projected through said lens and displayed on the screen 20, are merged into coincidence upon the screen 20 at a distance of 500 yards away from said range-finder for use with a later speed computation of an oncoming vehicle.

*Example 2*

A suspected speeder is traveling away from the operator's stationary vehicle and the range-finder 10.

The operator causes the indicator 83 to be in its normal position adjacent the zero character 99, by the means above described and manually rotates the knob 32, in the direction of the arrow 46, causing the lens 18 to shift toward the lens 17, thereby causing the range-finder to be set for 250 yards; i. e., the lenses are thereby so arranged that images of the speeder's vehicle will merge into coincidence at a distance of 250 yards from the range-finder 10.

At the time the operator manually rotates the knob-housing 32, the latter is in the position shown in Figure 4, and the spring 42 is in the position shown in said figure by the solid-line position thereof, whereby the spring is urging the reach-rod 33 in the direction of the arrow 34, and upwardly. Since the spring 42 is so constructed, it is not strong enough to provide sufficient urge to overcome the weight of the rod 33, whereby the rod 33 is not moved upwardly except at times when and by means of the operator pressing the button 91 for moving the plunger 86 downwardly, the outer end of the lever 93 upwardly, together with the rod 33.

The officer then observes the screen 20, and at the instant the images 21 and 26 merge into coincidence, the officer then depresses the button 91 for causing an actuation of the stop-watch mechanism, a rotation of the indicator 83 away from its normal stationary position at the zero character 99. At the time of said coincidence, the operator then presses the end 52 of the lever 49 with his finger for permitting the spring 42 to rotate the knob 32 in a counter-clockwise direction, or a direction reverse to the arrow 46, for causing the lens 18 to become correspondingly shifted toward the mirror 19, whereby the setting of the range-finder is then for 500 yards' distance: namely, the setting is such that at the time, images of the speeder again merge into coincidence the second time, the distance will be 500 yards from said officer and the range-finder 10. During the time the speeder travels from said distance of 250 yards to the distance of 500 yards, images of the speeding vehicle appear dual as indicated at 21 and 26 in Figure 1, and at the time of said second coincidence of said dual images which is at said 500 yards' distance from the operator, the latter then presses the button 91 for locking the main spring of the stop-watch mechanism, and also, simultaneously, of the indicator 83, whereby the latter is then above a certain one of the sets of numerals adjacent the perimeter of the speed-dial, whereby the speed of travel of the speeder is indicated for said 250 yards' distance of travel.

Since the button 91 has been pressed said second time, the range of the device 10 is thereby again changed from 500 to 250 yards, and for further use, the operator must regulate the device accordingly.

*Example 3*

A vehicle is approaching the operator, and the device 10 and the latter is also in motion, as at times when said device is mounted upon the automobile 57, as shown in Figure 1.

The operator drives his vehicle 57 at a constant rate of speed. He notices said constant rate by observing the speedometer 79 of his vehicle. Assuming that his constant speed is 20 miles per hour, he then manually rotates the node 76 so that the numeral 20 of the node is above the zero character thereof for oncoming traffic is in alignment with the line of demarcation 78, whereby the discs 70A through K, are correspondingly rotated, as above described, for correspondingly reducing the values of the sets of numerals of said discs which then and thereby are visible through the openings 71 of the face-plate 68, for compensating for the rate of speed of his vehicle in the final finding or equation, pointed out by the indicator 83. Said compensating having been consummated, the operation is as above described for Example 1.

*Example 4*

A speeding vehicle is passing the operator while the latter's vehicle is in motion.

The officer's vehicle is caused to travel at a constant rate of speed or approximately so as above stated in Example 3 and the node 76 is then manipulated. Assuming that the speed of the operator's vehicle is 30 miles per hour, the node 76 is rotated to cause the numeral 30 which appears below, for passing vehicles, the zero character of the node 76, to become in alignment with the line of demarcation 78, for rotating the discs 70A through K, correspondingly for compensating for the speed of travel of the officer's vehicle in a forward direction at 30 miles per hour, whereupon the further parts of the operation are as above described in Example 2.

*Example 5*

A speeder is approaching an operator and the device 10 is stationary, and said operator fails to notice said speeder until such time as the speeder is at a distance which is less than 500 yards and more than 250 yards from the operator, the latter, nevertheless, ascertains the speed of the speeder.

The operator manipulates the knob 32 so that said knob and its immediate adjunct parts, are then positioned as shown in Figure 4, whereby the lens 18 is shifted toward the lens 17 for causing images of the oncoming speeding automobile to appear on the screen 20 in coincidence at a distance of 250 yards from the device 10, and notices that the indicator 83 is in its normal position above the zero character 99, and that the compensating node 76 is also in a normal position, since the vehicle 51 is stationary. He then waits until the images 21 and 26 of the oncoming speeding-automobile are merged into coincidence at 250 yards' distance.

At the time said images are in coincidence at said 250 yards' distance, the officer then depresses the button 91 for causing the indicator 83 to revolve. The operator then waits until said oncoming automobile is about to pass his vehicle and the device 10, and at the instant of passing, he depresses the button 91 a second time for causing stoppage of the indicator 83 above one of the sets of numerals on the perimeter of the dial for ascertaining the speed of the speeder.

Referring to Figure 8, the speed indicants or numerals generally indicated at 70' are disposed upon the disc 70E inclinedly, so that said numerals will appear approximately horizontal through their respective openings 71, of the speed-dial plate 68, and for said purpose, the numerals on the discs 70G and 70F are disposed transversely across the annular surface of said discs. The discs 70A through K are solely a convenience in translating the time required for the indicator 83 of the stop-watch to travel or swing from its normal, stationary position at 99, to a stopped position adjacent one of said discs, into miles-per-hour terms or rates of speeds, and for many uses, said discs and their adjunct parts may be dispensed with.

Among other advantages of the invention, the latter is particularly efficient in use at night-time in conjunction with oncoming automobiles in particular, since the headlights of motor vehicles blend into coincidence readily, and heretofore there has not been a dependable method or means for checking speeds of motor vehicles with the exception of the costly and dangerous manner of patrolmen trailing speeders at night as heretofore practiced.

From the foregoing description, it is thought to be obvious that a speed computator constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish that it be understood as limiting myself to the precise arrangement and formation of the several parts herein shown in carrying out my invention in practice, except as claimed.

I claim:

1. In combination, a screen, a range finder cooperatively associated with said screen set to visibly display a light-ray image of a distant moving object on said screen and a display of said object having different characteristics with respect to an initial display at a different distance with respect to the combination and the first mentioned distance, operator controllable means for changing the setting of said range finder for selectively reversing the characteristics of said display at either of said distances, and a device responsive to a changing of the setting of said range finder for timing a movement of said object across the space between said distances.

2. In combination, a screen, a range finder cooperatively associated with said screen for visibly displaying dual light-ray images of a moving object on said screen at times when said object moves to a preselected distance with respect to the combination and a coincidental image of said moving object on said screen at a certain distance spaced from said preselected distance, means for shifting a lens of said range finder for selectively reversing the characteristics of said display on said screen at either of said distances, and a device for timing a movement of said object across the space between said distances.

3. An organization for indicating the speed of an object while the latter moves between two spaced apart positions, each of the positions being distant from the organization; a screen; a range finder cooperatively associated with said screen; the normal range-setting of the lenses of said finder being such that dual light-ray images of said object are visibly displayed on said screen at a certain one of said positions, and such that said images blend into coincidence on said screen at the other of said positions during a movement of said object; manually actuatable means for shifting a lens of said range-finder for causing said images to blend into coincidence on said screen at said certain position and to display dual images of said moving object on said screen at the time of arrival of said object at said other position; and a device for measuring the length of time which expires during which said object moves between said positions.

4. In an assembly for the purpose described, a screen, a range-finder set to visibly display dual light-ray images of a moving object on said screen at a time when said object is at a site distant with respect to the screen, means manually actuatable at said time for shifting a lens of said range-finder for causing said images to blend into a visible coincidence on said screen, a time measuring device, means responsive to a shifting of said lens for causing said device to initiate a time measurement, and means for arresting said measurement of time.

5. In an assembly for the purpose described, a screen, a range-finder having lenses set to visibly display dual light-ray replicas of a moving object on said screen, means for changing one of said lenses with respect to the other lenses of said range-finder for selectively causing said replicas to coincide in said display, a device for measuring time, means for initiating the operation of said device responsive to an actuation of said lens changing means, and means for arresting the operation of said initiating means.

6. In an assembly for the purpose described, a screen, an optical device set to display a light-ray image of a moving object on said screen, a chronometer having a revolvable indicator, a dial having spaced apart sets of numerals thereon for representing speeds of a moving object in terms of miles per hour, the spacing of said sets being complemental to the length of a movement of said indicator with respect to said sets, operator controllable means for causing said device to change the initial characteristics of said display on said screen and to simultaneously cause said chronometer to revolve said indicator with respect to said sets, said controllable means being actuatable for stopping said indicator adjacent one of said sets for pointing out to an operator the length of time said indicator moves in terms of miles per hour.

7. In an assembly for the purpose described, a screen, a range-finder set to visibly display light-ray images of a moving object on said screen, a time measuring device having a revolvable indicator, a dial having spaced apart sets of numerals thereon representing speeds of a moving object in terms of miles per hour, the spacing of said sets being complemental to the length of a movement of said indicator with respect to said sets, operator controllable means for causing said finder to change the characteristics of said display and to simultaneously cause said device to revolve said indicator with respect to said sets, said controllable means being actuatable for stopping said indicator adjacent one of said sets for pointing out to an operator the length of time said indicator moves in terms of miles per hour.

8. An organization for indicating the speed of an object while the latter moves between two spaced apart positions, each of the positions being distant from the organization, comprising a range finder having fixed and movable lenses, a screen operatively associated with the range finder and lenses, the normal range setting of the lenses of said finder being such that dual light ray images of said object are visibly displayed on said screen at a certain one of said positions, and blending into coincidence on said screen at the other of said positions during a movement of said object, manually actuated means for shifting said movable lens for causing said images to blend on said screen in certain positions and to display dual images of said moving object on said screen at the time of arrival of said object at said other position, and means for measuring the length of time which expires between said positions.

JOHN R. NIEMAN.